United States Patent
Hollars

(10) Patent No.: US 8,413,329 B2
(45) Date of Patent: Apr. 9, 2013

(54) COMPRESSED GAS CARTRIDGE LANCE HOUSING

(75) Inventor: Anthony S. Hollars, Tucson, AZ (US)

(73) Assignee: Illinois Tool Works Inc., Glenview, IL (US)

( * ) Notice: Subject to any disclaimer, the term of this patent is extended or adjusted under 35 U.S.C. 154(b) by 108 days.

(21) Appl. No.: 12/896,756

(22) Filed: Oct. 1, 2010

(65) Prior Publication Data
US 2011/0016692 A1    Jan. 27, 2011

Related U.S. Application Data

(63) Continuation of application No. 11/195,090, filed on Aug. 1, 2005.

(51) Int. Cl.
*B21K 1/20* (2006.01)
(52) U.S. Cl. ........... 29/890.124; 29/890.12; 29/890.125; 29/890.127; 137/318; 137/625.27; 137/625.5
(58) Field of Classification Search .................. 29/890.12–890.128; 137/15.16, 137/315.01, 318, 625.27, 625.5
See application file for complete search history.

(56) References Cited

U.S. PATENT DOCUMENTS

| | | | |
|---|---|---|---|
| 3,815,783 A | | 6/1974 | Hirata |
| 4,085,775 A | * | 4/1978 | Steele, Jr. ................ 137/625.5 |
| 4,972,971 A | | 11/1990 | Janko et al. |
| 5,694,686 A | * | 12/1997 | Lopez ..................... 29/890.126 |
| 5,908,044 A | * | 6/1999 | Kearns et al. .............. 137/15.16 |
| 6,601,731 B2 | | 8/2003 | Wu |
| 6,843,388 B1 | | 1/2005 | Hollars |
| 6,907,900 B2 | | 6/2005 | Markham et al. |

* cited by examiner

*Primary Examiner* — Richard Chang
(74) *Attorney, Agent, or Firm* — Dale F. Regelman; Quarles & Brady LLP

(57) ABSTRACT

The present invention minimizes the assembly time of a dispenser head by inserting a rigid seal retaining element. The seal retaining element comes in different configurations thus allowing a variety of compressed gas cartridge dispensing options. Additional features are integrated into a molded dispenser head thus requiring fewer components to accomplish a useable dispenser thus reducing manufacturing costs. Reliance on conformable plastic allows for relaxed dimensional tolerances. This method of making a dispenser head can equally apply to threaded or non-threaded lance housings.

4 Claims, 13 Drawing Sheets

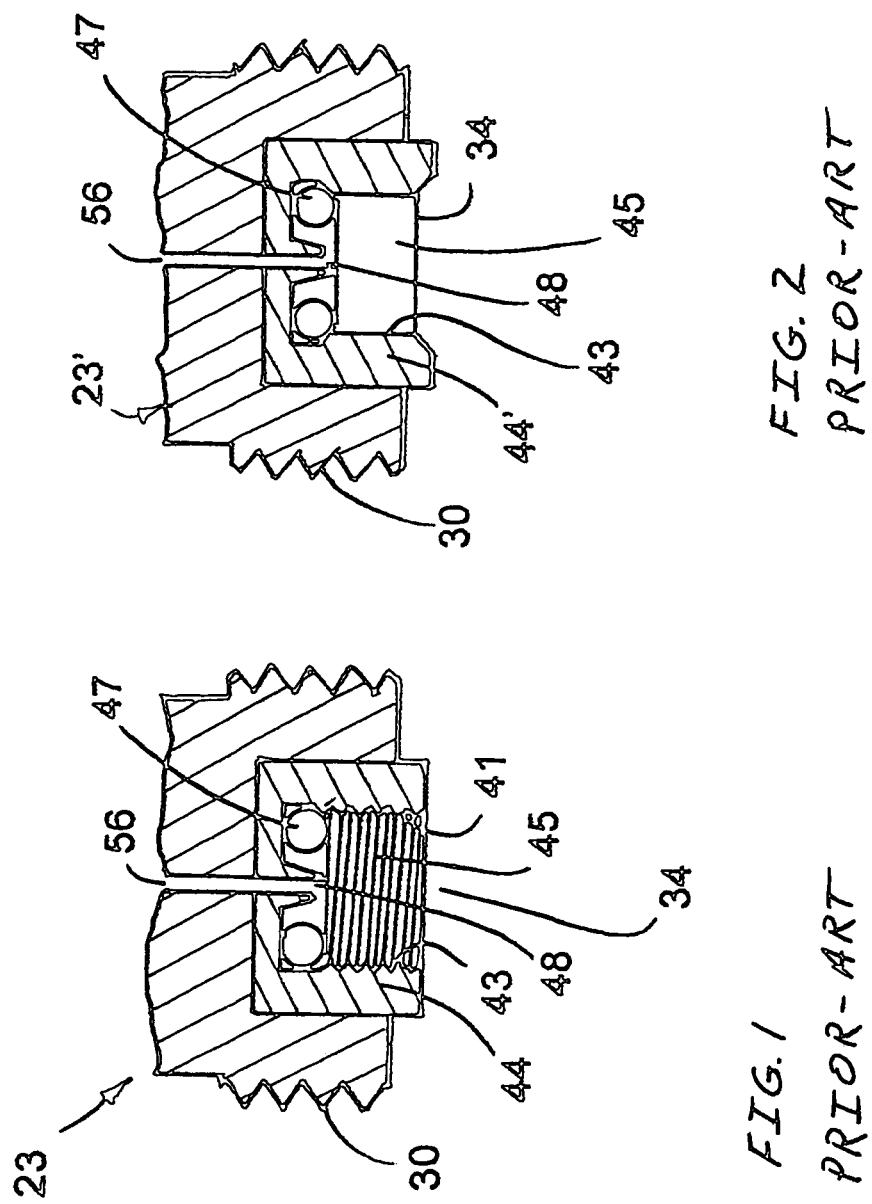

PRIOR-ART

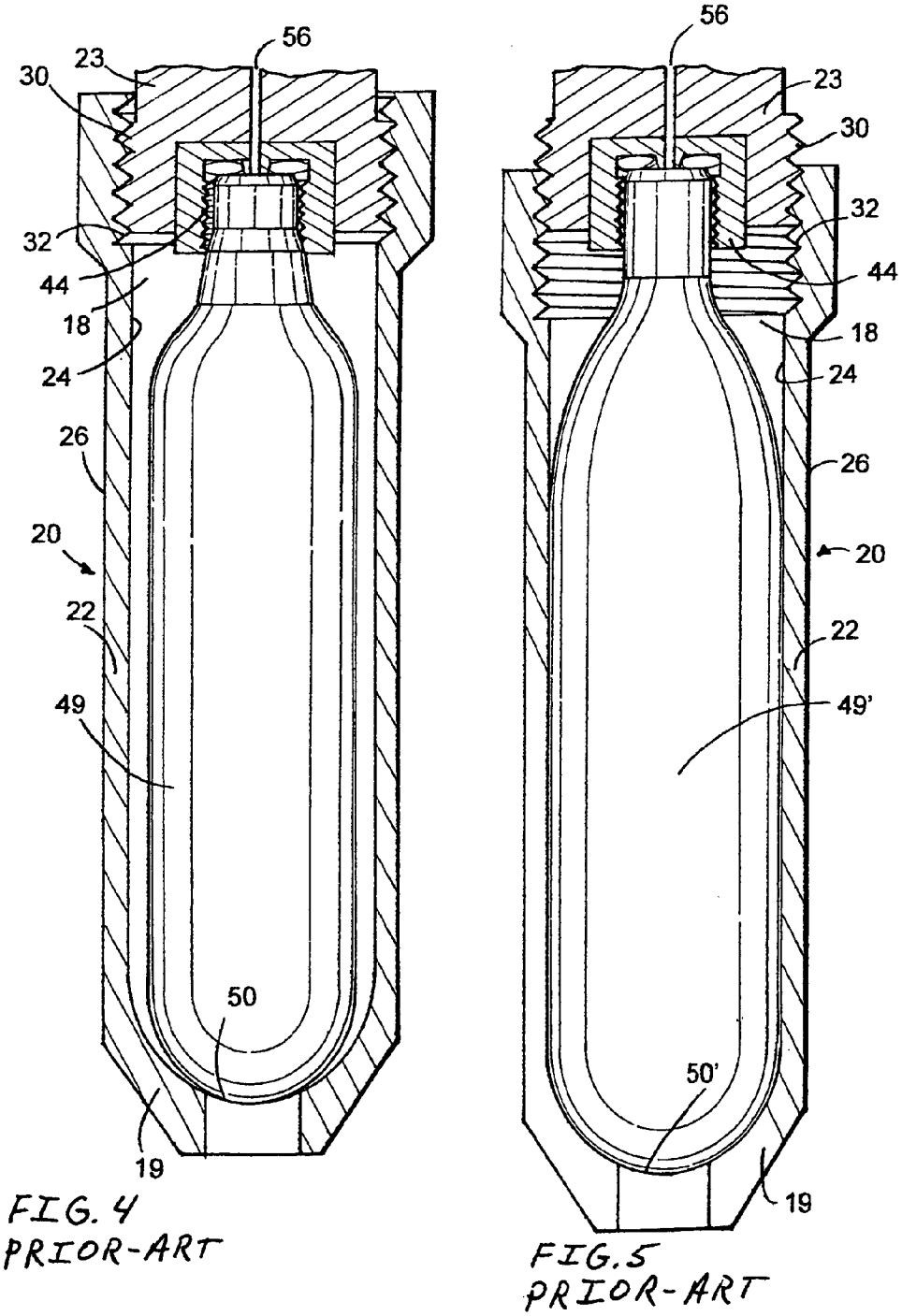
FIG. 4 PRIOR-ART
FIG. 5 PRIOR-ART

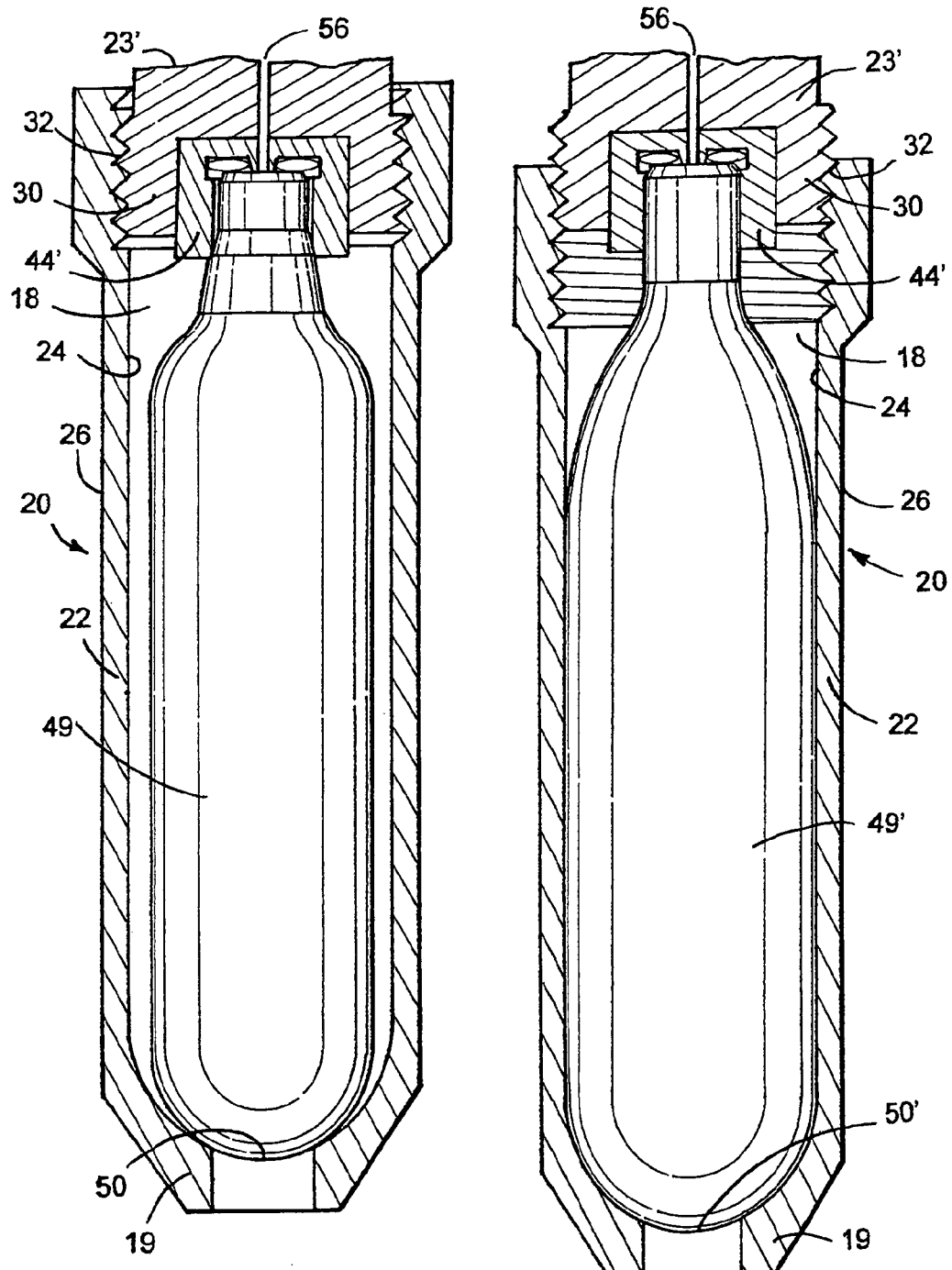
FIG. 6 PRIOR-ART
FIG. 7 PRIOR-ART

PRIOR-ART

SECTION A-A

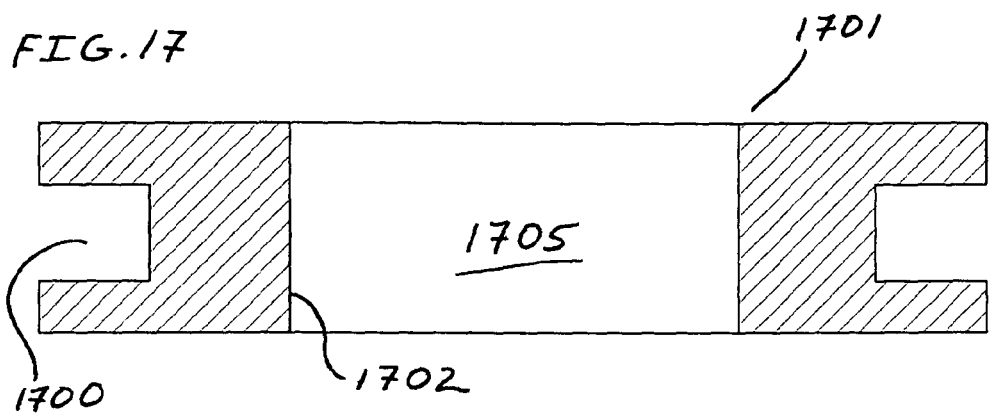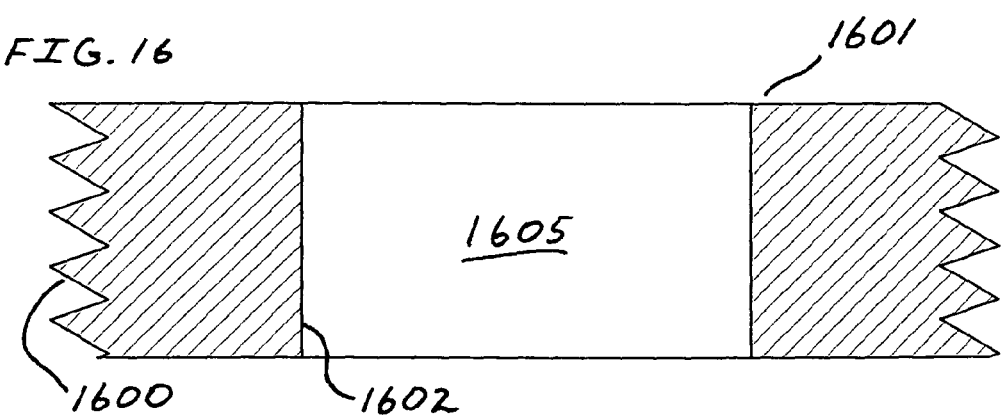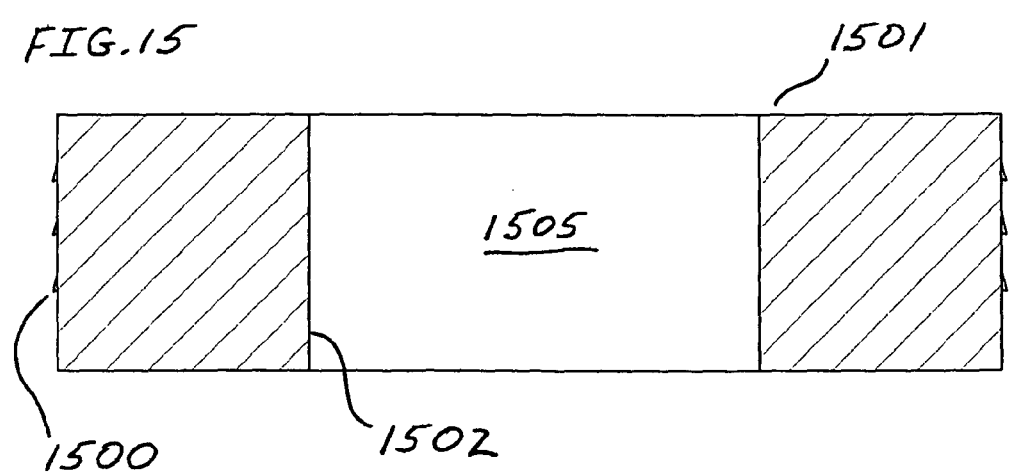

COMPRESSED GAS CARTRIDGE LANCE HOUSING

CROSS REFERENCE TO RELATED APPLICATIONS

This application is a Continuation Application claiming priority from a U.S. Utility application having Ser. No. 11/195,090 filed Aug. 1, 2005.

FEDERALLY SPONSORED RESEARCH

Not applicable.

REFERENCE TO A MICROFICHE APPENDIX

Not applicable.

FIELD OF INVENTION

The present invention relates to the field of portable pneumatic dispensers capable of being manufactured at a reduced cost and allowing fast assembly.

BACKGROUND OF THE INVENTION

Many current art compressed gas dispensers, particularly the models manufactured by Genuine Innvations, Inc, in Tucson, Ariz. U.S.A. are manufactured to dispense a non-threaded neck compressed gas cartridge, a threaded neck compressed gas cartridge or capable of dispensing both cartridge species within the same dispense.

One feature of current art compressed gas dispensers is a lance housing that has been used in part to contain the high pressure from a compressed gas cartridge. Historically, lance housings have been manufactured from metal such as brass. A lance housing also provides an excellent recess or pocket for a seal that is used to contain the compressed gas in a lanced cartridge. A lance housing can feature internal threads that are used to mate with a compressed gas cartridge also exhibiting a threaded portion. A lance housing sometimes exhibits no threads to mate with a compressed gas cartridge.

U.S. Pat. No. 6,843,388 by Hollars titled Compressed gas cartridge dispensing system allowing interchangeable use of different capacity compressed gas cartridges and novel storage feature teaches some methods of how a non-threaded neck compressed gas cartridge can be dispensed as well as teaches an additional method of how a threaded neck compressed gas cartridge can be dispensed. Additionally, the terminology from the U.S. Pat. No. 6,843,388 is carried over into this application in an effort to maintain consistency for ease of understanding. FIGS. 1-7 PRIOR-ART are borrowed directly from the U.S. Pat. No. 6,843,388 to exemplify common designs and uses of compressed gas cartridge lance housings.

Common types of lance housings such as exemplified in FIG. 1 PRIOR-ART illustrate an internally threaded exemplary lance housing 44 and in FIG. 2 PRIOR-ART illustrate a non-threaded exemplary lance housing 44'. Threaded lance housing 44 illustrated in FIG. 1 PRIOR-ART will accept a compressed gas cartridge 33 exhibiting a comparable male thread on its cartridge neck used to threadably draw cartridge 33 into the piercing lance. Exemplified in FIG. 3 PRIOR-ART is male threaded compressed gas cartridge 33 threaded into internally threaded lance housing 44 as part of dispenser head 23. Slightly visible in FIG. 3 PRIOR-ART is a piercing lance that has been drawn into the puncture surface of the compressed gas cartridge as a result of the threaded connection thus the compressed gas cartridge has been harnessed or lanced.

Additionally, threaded lance housing 44 can be used to dispense a non-threaded neck compressed gas cartridge 49 of one volume and 49' of a greater volume with the use of a cartridge-retaining container 22 as illustrated in FIGS. 4 and 5 PRIOR-ART. Both FIGS. 4 and 5 PRIOR-ART are borrowed from the U.S. Pat. No. 6,843,388. The compressed gas cartridge neck portion in both FIGS. 4 and 5 PRIOR-ART are small enough in diameter thus allowing the non-threaded necks to clear threaded lance housing portion 44 without an interference fit.

Non-threaded lance housing 44' exemplified in FIG. 2 PRIOR-ART is illustrated with a cartridge-retaining container 22 threadably attached in FIGS. 6 and 7 PRIOR-ART and will accept a compressed gas cartridge by incorporating cartridge-retaining container 22 to draw the cartridge into the piercing lance. FIGS. 6 and 7 PRIOR-ART exemplify two different capacity compressed gas cartridges 49 and 49' exhibiting non-threaded necks. A cartridge typically increases in length and diameter as the internal volume increases.

One United States patent that exemplifies the background relating to the present invention is U.S. Pat. No. 5,544,670 titled Inflation device for an inflatable article of manufacture and adaptor therefore by Philips et al. Applicant is a co-inventor on this patent as well. The technology in this patent has been common since as early as 1993. FIG. 8 PRIOR-ART is borrowed from the Philips et al. patent and illustrates a side view cross-section exemplary dispensing device. The relevant text in the Philips et al. specification to this figure states the following: " . . . lance supporting member 44 includes a cylindrical extension 43 which defines an interior area 45." This is an excellent example of a prior-art non-threaded lance housing that represents how the industry has designed and manufactured lance housings.

The lance housing has traditionally provided means for mounting a cartridge piercing lance as well as providing a recess for a compressed gas cartridge face seal, neck seal, or combination of both. A typical compressed gas cartridge piercing lance is made from steel, perhaps hardened, and is press-fit into a void within a lance housing. Current practice utilizes both solid lance designs and hollow lance designs with reliable success. Also common is to insert a brass lance housing into an injection molded dispensing head and retain the lance housing in place with hardware such as a roll pin or utilize one-way barb features on the outside of a lance housing.

The present invention minimizes the assembly time of a dispenser head. Additional features are integrated into a molded dispenser head thus requiring fewer components to accomplish a useable dispenser thus reducing manufacturing costs. Reliance on conformable plastic allows for relaxed dimensional tolerances. This method of making a dispenser head can equally apply to threaded or non-threaded lance housings.

Prior-art lance housings are mostly realized as providing a bore that a puncturing lance presses into resulting in a lance is contained in the metal of a lance housing. Additionally, a retaining undercut pocket has traditionally been machined into a lance housing to locate the compressed gas cartridge seal.

The present invention illustrates an exemplary mounting of a compressed gas cartridge puncturing lance in the main housing of a dispensing head. Additionally, a compressed gas cartridge seal retaining undercut is created by the insertion of a rigid seal retaining element into a molded dispensing head. One obvious advantage to this method of manufacturing a compressed gas cartridge seal pocket by the insertion of a retaining element is that a molder would find molding a feature difficult or impossible. Typically, injection molding retaining undercuts such as described is not a moldable feature.

The following embodiments will describe the afore-mentioned prior-art and the present invention. Additionally, with the aid of figures, one skilled in the art will be able to understand and appreciate the embodiments to follow.

OBJECTS AND ADVANTAGES

Accordingly, several objects and advantages of the present invention will be presented in the following paragraphs followed by a thorough disclosure of each aspect in the accompanying embodiments in the DETAILED DESCRIPTION.

In light of the above-mentioned problems, it is therefore an object of the present invention to provide a quick method of manufacturing a compressed gas dispenser therefore reducing material and labor expenses.

Further, it is another object of the present invention to provide means for additional safety venting without increasing the number of parts.

It is another object of the present invention to reduce manufacturing tolerances of components without sacrificing quality.

Another object of the present invention is to make a functional compressed gas dispenser lighter in weight than current designs.

Another object of the present invention is to provide a lance housing arrangement capable of disassembly for service or component replacement.

It is another object of the present invention to utilize as little metal as possible in a lance housing and incorporate as many features as possible with an injection molded dispensing head.

Another object of the present invention is to provide means for mounting a compressed gas cartridge piercing lance into a plastic dispensing head.

Additionally, another object of the present invention is to provide means for a compressed gas cartridge seal retaining undercut through this new style of lance housing.

Further objects and advantages will become apparent in the following paragraphs. Solely and in combination, the above objects and advantages will be illustrated in the exemplary figures and accompanying embodiments to follow.

BRIEF DESCRIPTION OF THE DRAWINGS

The figures are exemplary of different embodiments of the present invention. Each illustration conveys the invention and is not to be considered as limiting, rather, exemplary to the scope and spirit of the present invention. Like components in the figures share identical numbering.

FIG. 1 PRIOR-ART illustrates a side sectional view of an exemplary internally threaded lance housing, intended to illustrate general lance housing construction, borrowed from U.S. Pat. No. 6,843,388;

FIG. 2 PRIOR-ART illustrates a side sectional view of an exemplary non-threaded lance housing, intended to illustrate general lance housing construction, borrowed from U.S. Pat. No. 6,843,388;

FIG. 4 PRIOR-ART illustrates a side section view of the exemplary internally threaded lance housing from FIG. 1 shown lancing a non-threaded compressed gas cartridge with the use of a cartridge-retaining container, borrowed from U.S. Pat. No. 6,843,388;

FIG. 5 PRIOR-ART illustrates a side section view of the exemplary internally threaded lance housing from FIG. 1 shown lancing a non-threaded compressed gas cartridge with the use of a cartridge-retaining container, borrowed from U.S. Pat. No. 6,843,388;

FIG. 6 PRIOR-ART illustrates a side sectional view of the exemplary non-threaded lance housing from FIG. 2 shown lancing a non-threaded compressed gas cartridge with the use of a cartridge-retaining container, borrowed from U.S. Pat. No. 6,843,388;

FIG. 7 PRIOR-ART illustrates a side sectional view of the exemplary non-threaded lance housing from FIG. 2 shown lancing a non-threaded compressed gas cartridge with the use of a cartridge-retaining container, borrowed from U.S. Pat. No. 6,843,388;

FIG. 15 illustrates a cross-sectional view of an exemplary seal retaining element comprising retaining barbs, in accordance with an embodiment of the present invention;

FIG. 16 illustrates a cross-sectional view of an exemplary seal retaining element comprising external mounting threads, in accordance with an embodiment of the present invention;

FIG. 17 illustrates a cross-sectional view of an exemplary seal retaining element comprising a groove for retaining a pin(s), in accordance with an embodiment of the present invention;

DETAILED DESCRIPTION

The following paragraphs will detail, at minimum, the best mode of the present invention. The exemplary figures and description of the invention as it is exemplified in each figure is representative of the current invention and the scope of the invention disclosure is not intended to be limited by the exemplary teachings. Like physical structure in different figures share the same identifying numbers.

Figure 9:
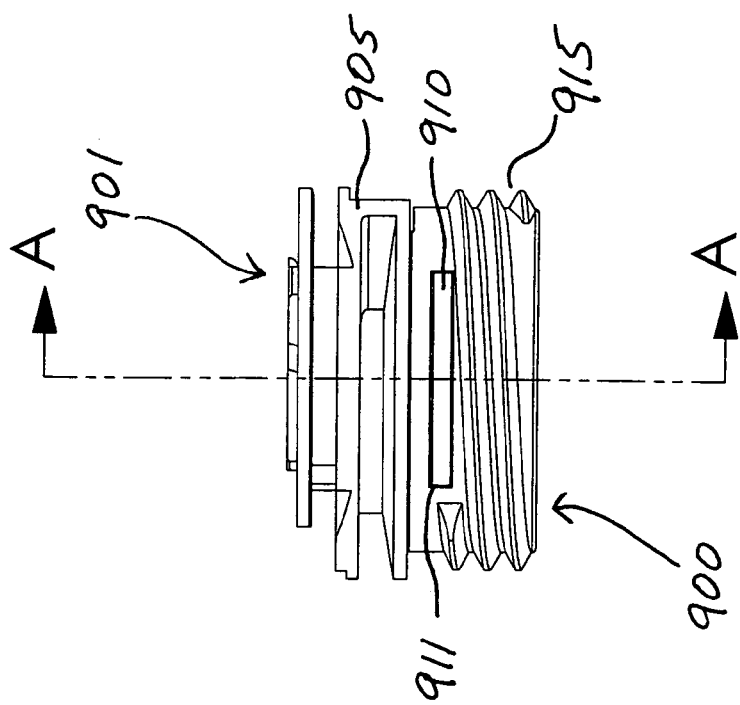
FIG. 9 illustrates a side view of an exemplary lance housing assembly in a compressed gas cartridge dispensing head, in accordance with an embodiment of the present invention.

FIG. 9 illustrates a side view of an exemplary lance housing assembly in a compressed gas cartridge dispensing head, in accordance with an embodiment of the present invention. An inlet end 900 and an outlet end 901 of a compressed gas cartridge dispensing head 905 are shown. Inlet end 900 is the end of the dispensing head that contains the compressed gas cartridge lancing means. Outlet end 901 is illustrated as truncated downstream from the compressed gas cartridge lancing means. The aforementioned prior-art examples offer some suggestion as to the type of apparatus that outlet end 901 can be fluidly attached to and there are numerous other applications both in the known and new art that outlet end 901 can fluidly attach. Apparatus examples are portable blowers, inflation heads having valve attachments, portable pressure regulators, dump valves such as for fire extinguishing, and other devices.

An external thread 915 is illustrated on dispensing head 905 and connects with a cartridge-retaining cup that will be illustrated in some following FIGS.

Figure 3:
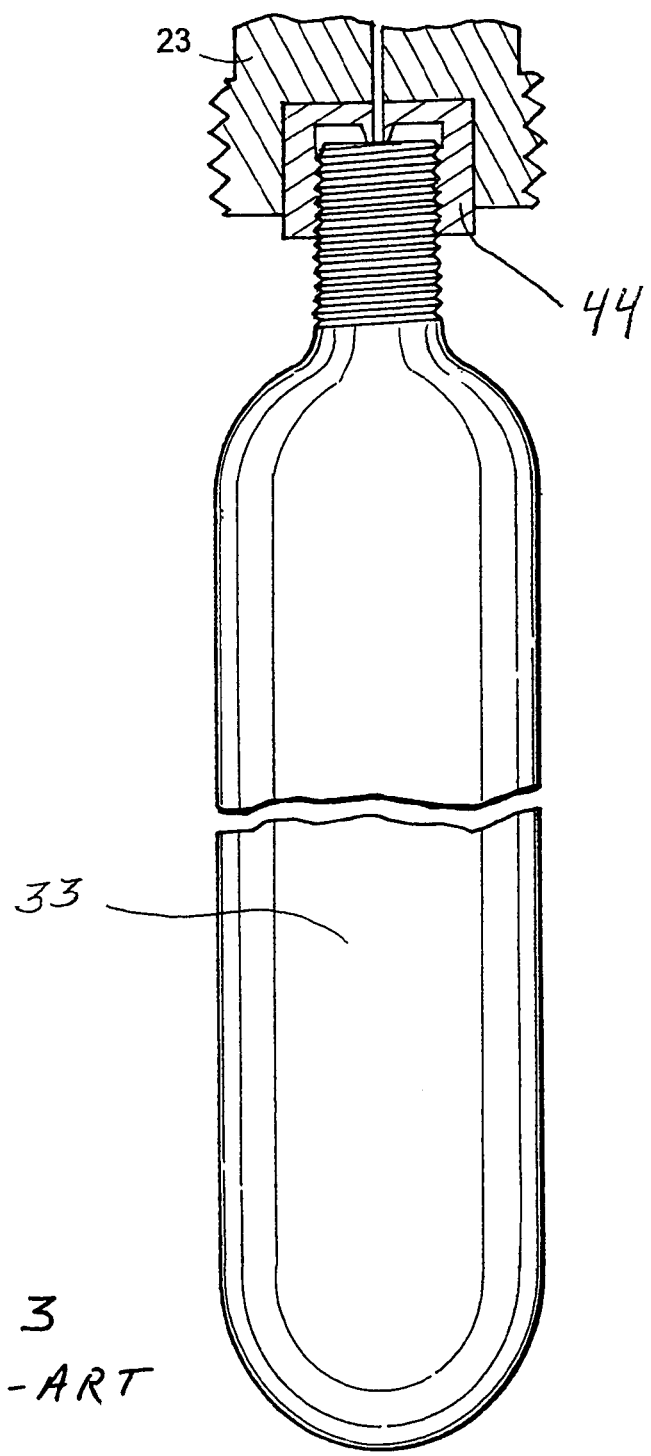
FIG. 3 PRIOR-ART illustrates a side section view of the exemplary internally threaded lance housing from FIG. 1 mated with a threaded neck compressed gas cartridge, borrowed from U.S. Pat. No. 6,843,388.
Figure 8:
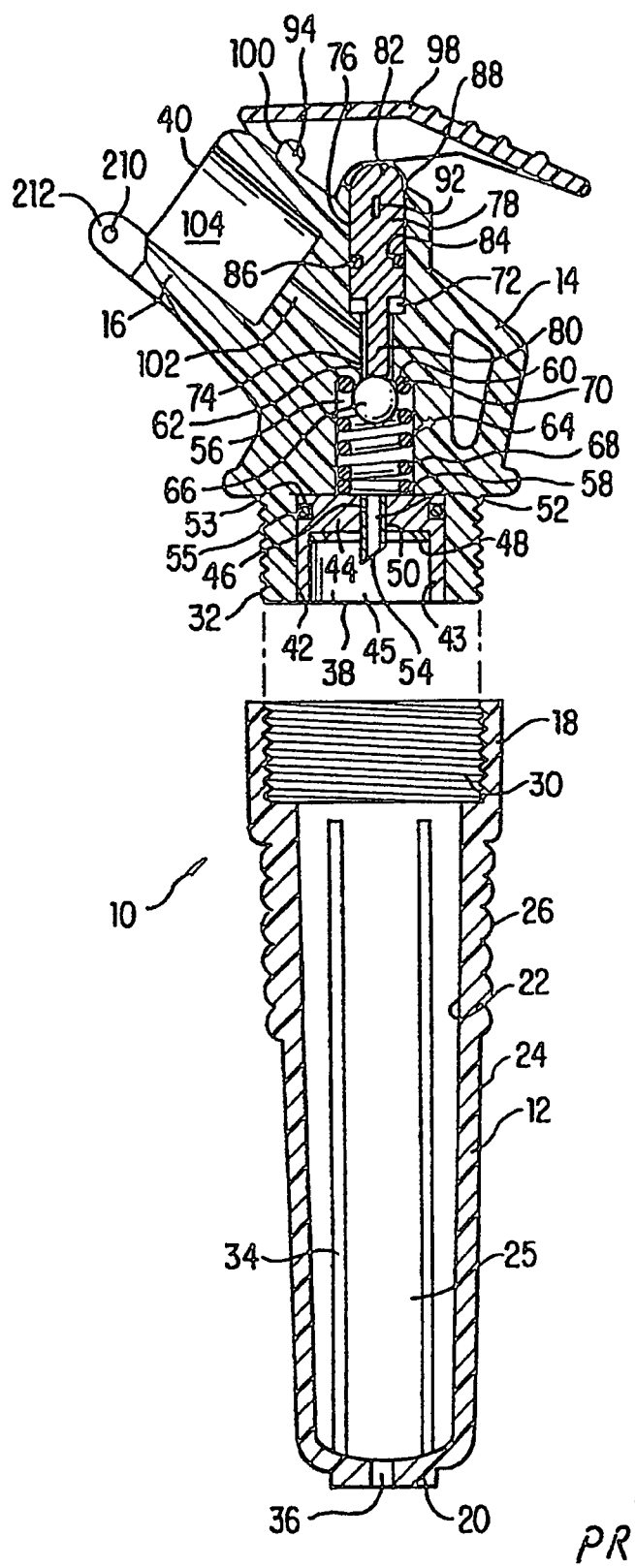
FIG. 8 PRIOR-ART illustrates a side sectional view of an exemplary compressed gas cartridge dispenser detailing a typical lance assembly, borrowed from U.S. Pat. No. 5,544,670.
Figure 10:
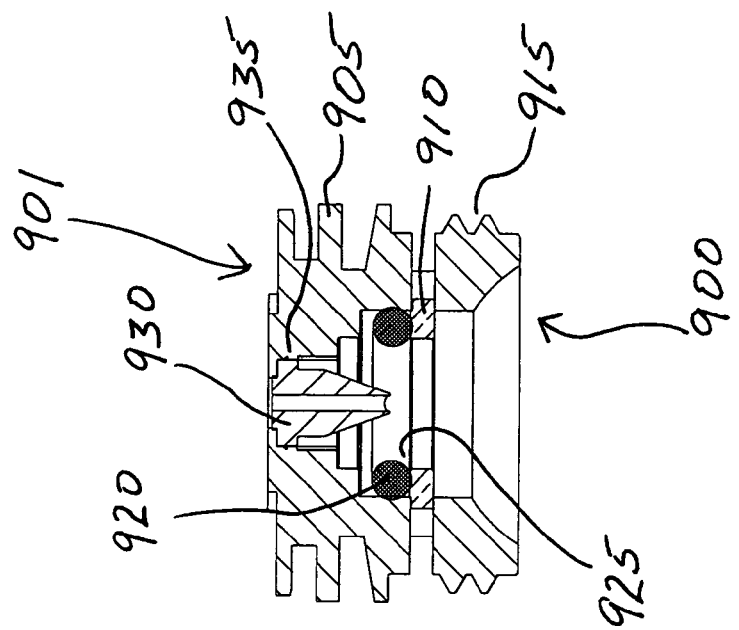
FIG. 10 illustrates a cross-section view A-A of the exemplary lance housing assembly in a compressed gas cartridge dispensing head from FIG. 9, in accordance with an embodiment of the present invention.

FIG. 10 shows a cross-sectional view A-A taken from FIG. 9 and illustrates an exemplary lance housing assembly, in accordance with an embodiment of the present invention. Dispensing head 905 comprises a tapered cartridge lead-in at inlet end 900 that can help guide insertion of a compressed gas cartridge by a user. Within inlet end 900, a hollow compressed gas cartridge piercing lance 930 hereinafter lance, is press-fit into dispensing head 905. A ring of lance barbs 935 maintain lance 930 in position in dispensing head 905. A compressed gas cartridge seal 920 situates substantially about lance 930. A seal retaining element 910 (FIGS. 9 and 10) is inserted through window 911 and is maintained in place by an interference fit with at least some portion of window 911. A retaining undercut 925 maintains compressed gas cartridge seal 920 into position thus creating a pocket for seal 920.

Figure 11:
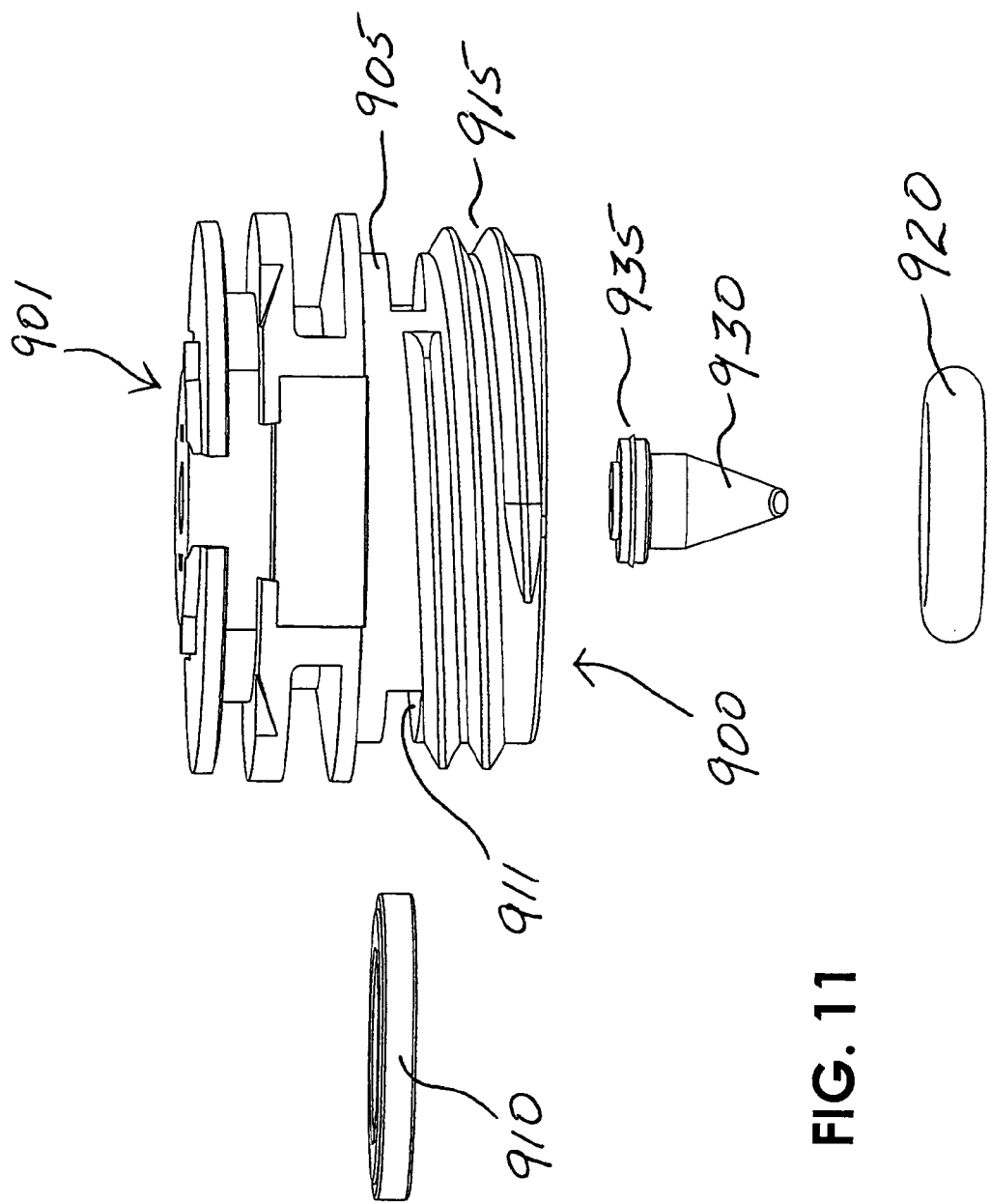
FIG. 11 illustrates an exploded view of the exemplary lance housing assembly in a compressed gas cartridge dispensing head from FIG. 9, in accordance with an embodiment of the present invention.

FIG. 11 illustrates an exploded view of the exemplary lance housing assembly in the compressed gas cartridge dispensing head from FIG. 9, in accordance with an embodiment of the present invention. Clearly visible in this view is window 911 for seal retaining element 910. Window 911 can be on one side of dispensing head 905 or continue through dispensing head 905. The truncation of outlet end 901 is also more visible in this view.

Figure 12:
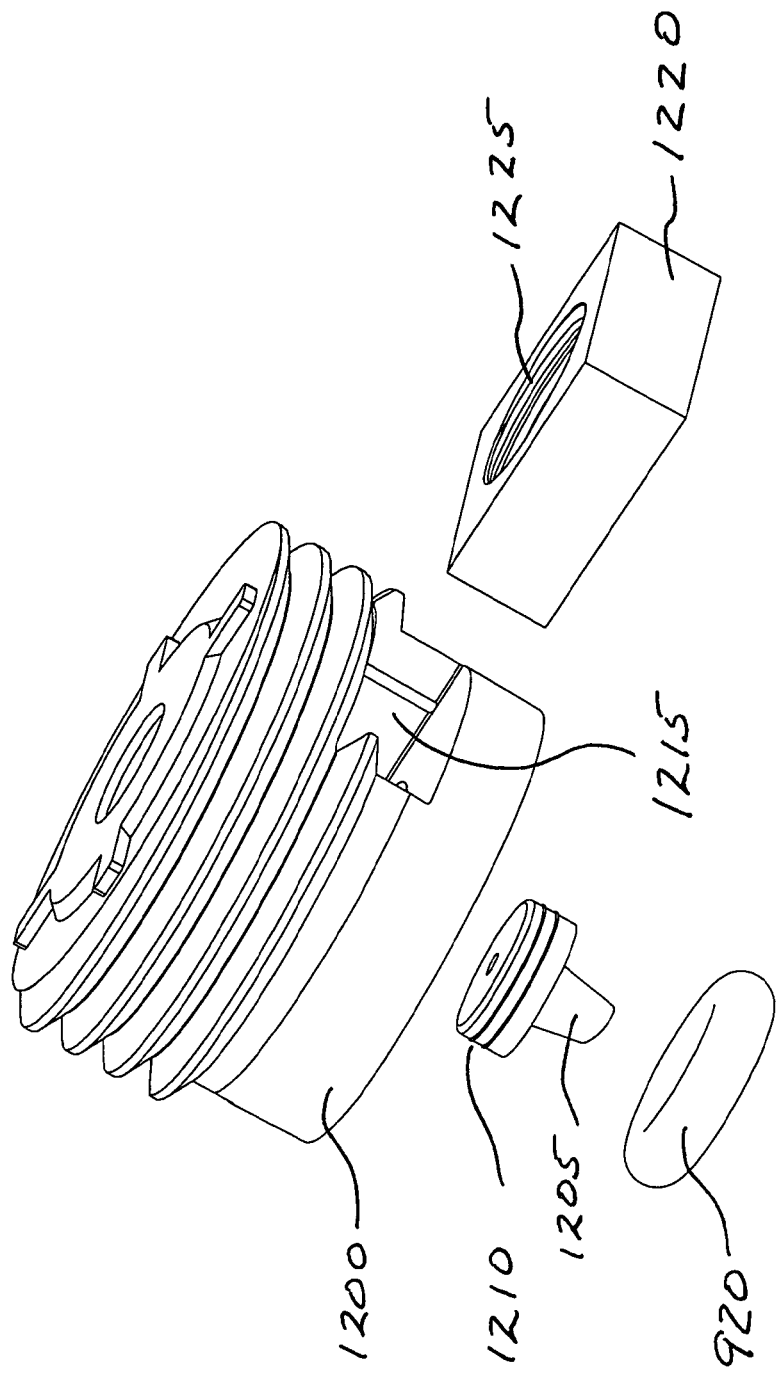
FIG. 12 illustrates an exploded view of an exemplary compressed gas cartridge dispensing head, in accordance with an embodiment of the present invention.

FIG. 12 illustrates an exploded view of an exemplary compressed gas cartridge dispensing head, in accordance with an embodiment of the present invention. A dispensing head 1200 features a window 1215 similar to window 911 from FIGS. 9-11. Window 1215 is taller in this embodiment to allow a threaded seal retaining element 1220 to have an adequate thread range 1225 for safe connection to a threaded compressed gas cartridge (not shown in this view). The rectangular profile of seal retaining element 1220 prevents rotation upon lancing a compressed gas cartridge.

Figure 14:
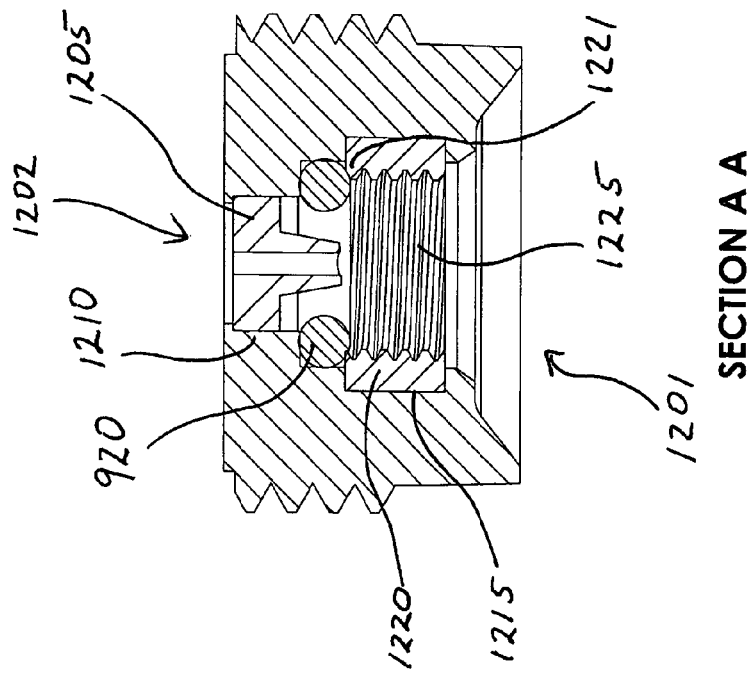
FIG. 14 illustrates a cross-sectional view A-A of the exemplary compressed gas cartridge dispensing head from FIG. 13, in accordance with an embodiment of the present invention.
Figure 13:
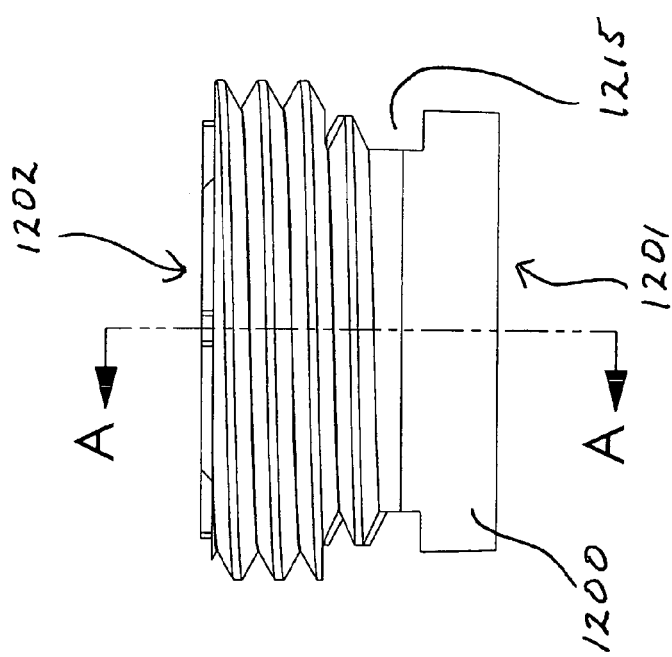
FIG. 13 illustrates a side view of the exemplary compressed gas cartridge dispensing head from FIG. 12, in accordance with an embodiment of the present invention.

Alternate views of FIG. 12 in FIGS. 13 and 14 illustrate dispensing head 1200 comprising a tapered cartridge lead-in at inlet end 1201 that can help guide insertion of a compressed gas cartridge by a user. Within inlet end 1201, a hollow compressed gas cartridge piercing lance 1205 hereinafter lance, is press-fit into dispensing head 1200. One skilled in the art could readily recognize that a solid compressed gas piercing lance is another minor deviation from the exemplified embodiment. A ring of lance barbs 1210 maintain lance 1205 in position in dispensing head 1200. Compressed gas cartridge seal 920 situates substantially about lance 1205. A seal retaining element 1220 is inserted through window 1215 and is maintained in place by an interference fit with at least some portion of window 1215. A retaining undercut 1221 maintains compressed gas cartridge seal 920 into position thus creating a pocket for seal 920.

Figure 18:
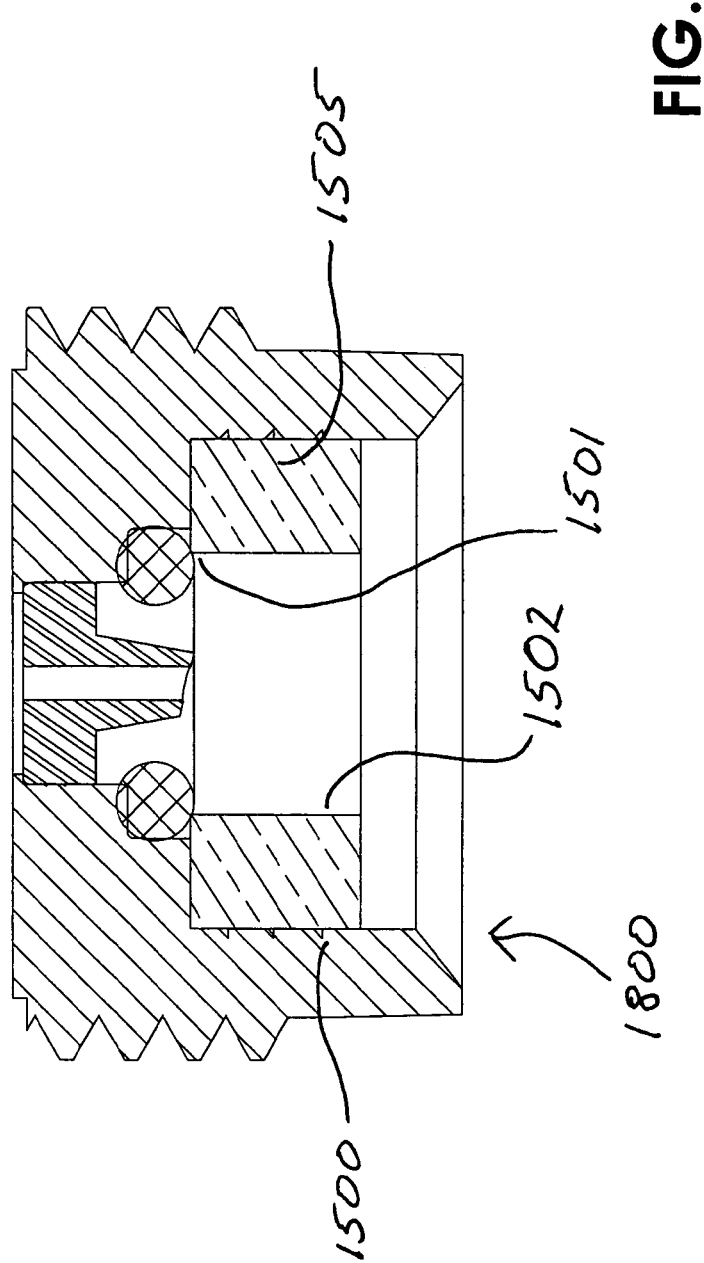
FIG. 18 illustrates a cross-sectional view of an exemplary dispensing head comprising the barbed seal retaining element introduced in FIG. 15, in accordance with an embodiment of the present invention.

In accordance with an embodiment of the present invention, FIG. 15 illustrates a cross-sectional view of an exemplary barbed seal retaining element 1505 comprising a one-way push in retaining feature. A barb or series of barbs 1500 allow the seal retaining element to press into a dispensing head from its inlet end and provide a retaining undercut 1501 for the compressed gas cartridge seal when in the installed position. An internal bore 1502 is illustrated smooth and can additionally be threaded thus allowing a user to lance a larger group of compressed gas cartridges. Additionally exemplified in FIG. 18 is a dispensing head assembly comprising barbed seal retaining element 1505 installed through an inlet end 1800 of a molded dispensing head.

Figure 19:
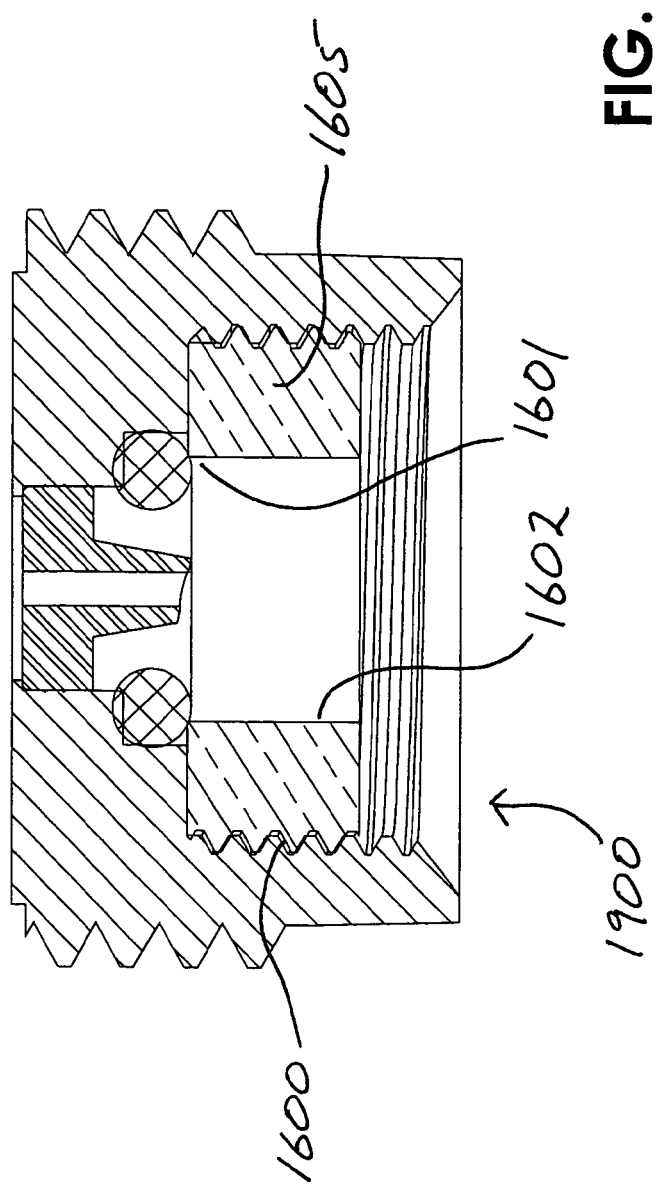
FIG. 19 illustrates a cross-sectional view of an exemplary dispensing head comprising external mounting threads on the seal retaining element introduced in FIG. 16, in accordance with an embodiment of the present invention.

Another embodiment in FIG. 16 includes using external threads on a seal retaining element 1605 as a retaining means in a dispensing head. An external thread 1600 can either cut into or mate with opposite gender threads in a dispensing head. Additionally, a retaining undercut 1601 for the compressed gas cartridge seal is provided when in the installed position. An internal bore 1602 is illustrated smooth and can additionally be threaded thus allowing a user to lance a larger group of compressed gas cartridges. Additionally exemplified in FIG. 19 is a dispensing head assembly comprising external mounting threads on seal retaining element 1605 installed through an inlet end 1900 of a molded dispensing head.

Figure 20:
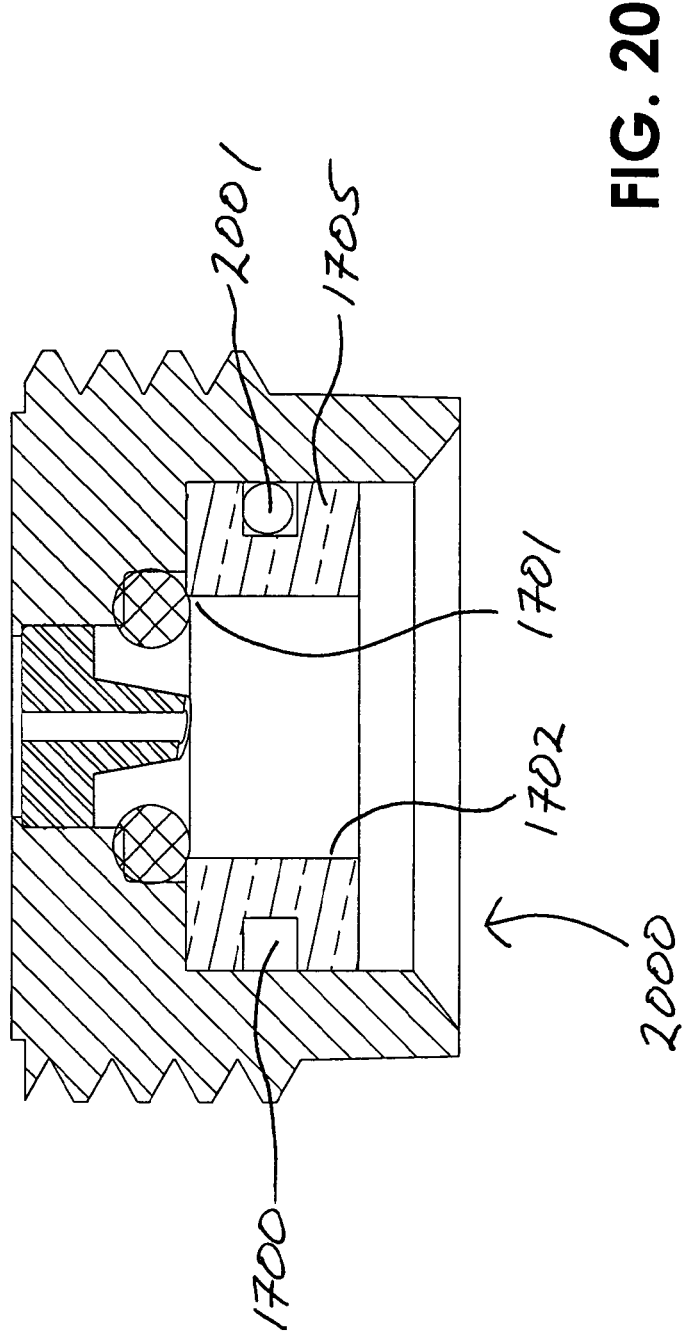
FIG. 20 illustrates a cross-sectional view of an exemplary dispensing head comprising the grooved seal retaining element for retaining pins introduced in FIG. 17, in accordance with an embodiment of the present invention.

An additional embodiment in FIG. 17 includes using a stake pin retaining slot as a means to retain the seal retaining element into a dispensing head. A stake pin retaining slot 1700 allows a fastener such as a roll pin to be inserted through an opening on a dispensing head and catch with stake pin retaining slot 1700. Additionally, a retaining undercut 1701 for the compressed gas cartridge seal is provided when in the installed position. An internal bore 1702 is illustrated smooth and can additionally be threaded thus allowing a user to lance a larger group of compressed gas cartridges. Additionally exemplified in FIG. 20 is a dispensing head assembly comprising grooved retaining seal element 1705 installed through an inlet end 2000 of a molded dispensing head. A roll pin 2001 or comparable staking pin inserts through a hole in dispensing head, and at least partially engages pin retaining slot 1700 thus keeping grooved retaining seal element 1705 situated within dispensing head.

What is claimed is:

1. A method to manufacture a compressed gas cartridge lance housing, comprising:
    providing a cylindrical dispensing head comprising an outlet end, a cylindrical housing, and a tapered cartridge lead-in at an inlet end, wherein said dispensing head is formed to include an internal bore;
    a piercing lance disposed within said outlet end;
    wherein said cylindrical housing is formed to include an aperture extending therethrough;
    inserting a seal retaining element into a second aperture formed in a side of the housing;

wherein:
said seal retaining element is maintained in place by an interference fit with at least some portion of said aperture;
said seal retaining element provides an undercut to retain an O-ring seal.

2. The method of claim 1, wherein said seal retaining element comprises a threaded internal bore.

3. The method of claim 1, wherein said seal retaining element comprises a non-threaded internal bore.

4. The method of claim 1, wherein said compressed gas cartridge lance housing is made from glass-filled nylon.

\* \* \* \* \*